UNITED STATES PATENT OFFICE.

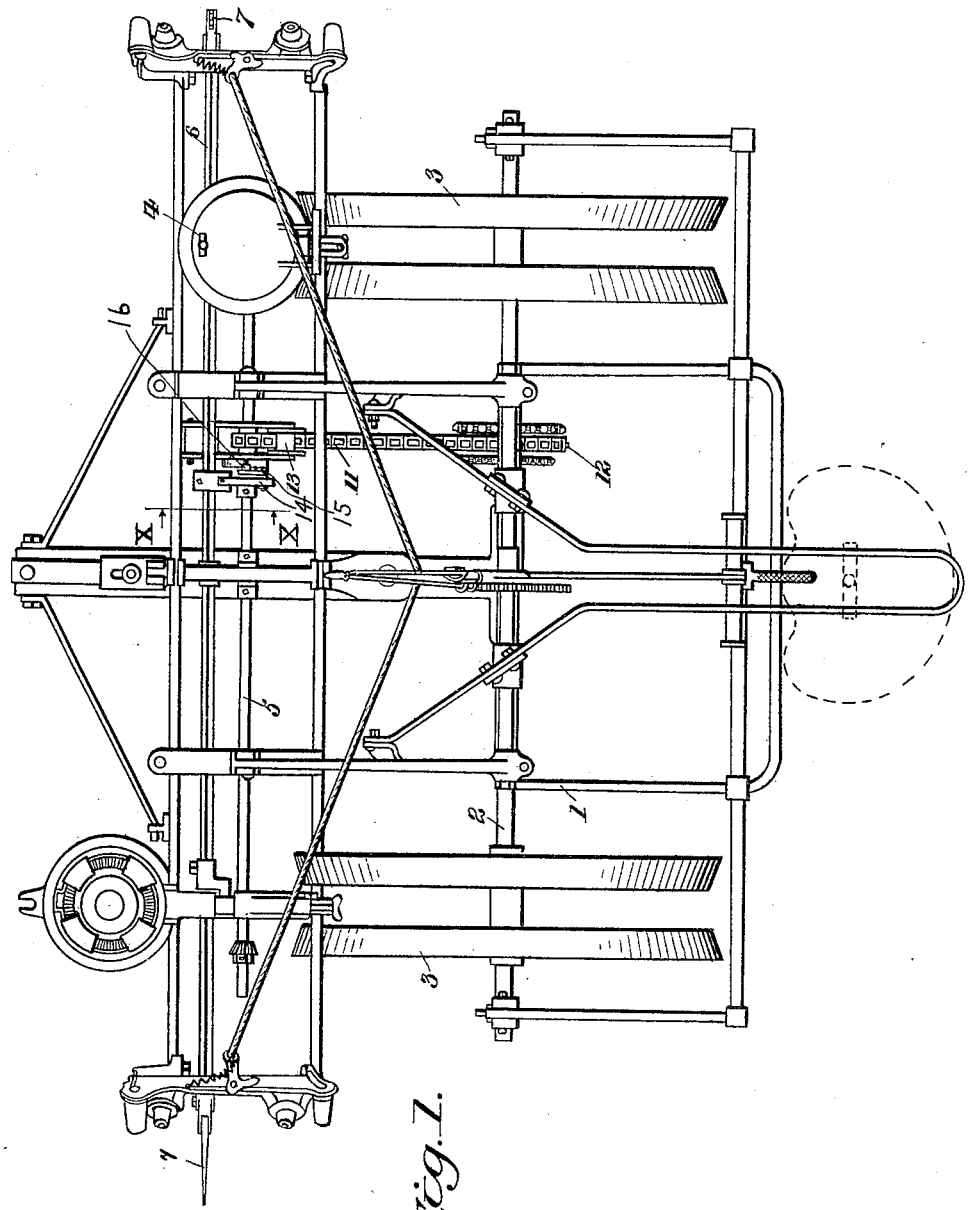

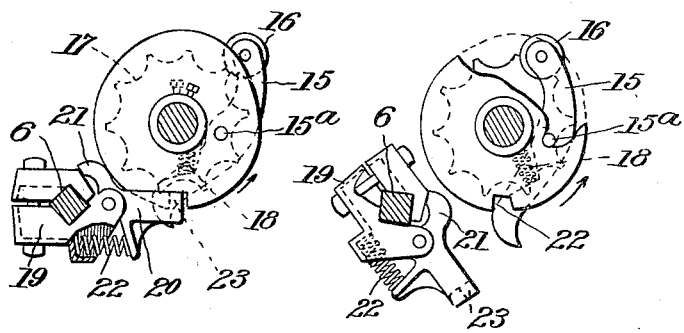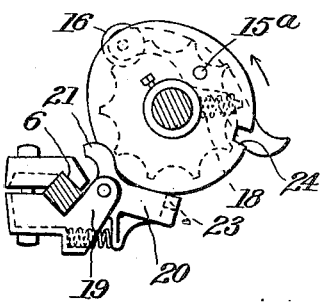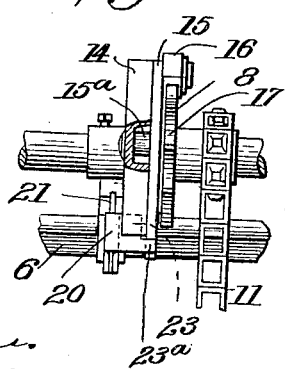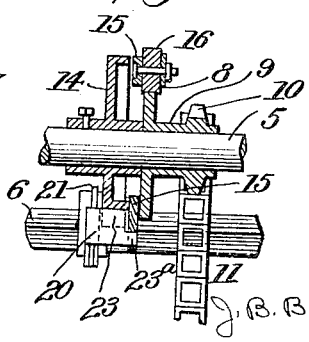

JOHN B. BARTHOLOMEW, OF PEORIA, ILLINOIS, ASSIGNOR TO AVERY COMPANY, A CORPORATION OF ILLINOIS.

CLUTCH MECHANISM FOR PLANTERS.

1,131,898.   Specification of Letters Patent.   Patented Mar. 16, 1915.

Original application filed March 6, 1908, Serial No. 419,434. Divided and this application filed June 21, 1911. Serial No. 634,510.

*To all whom it may concern:*

Be it known that I, JOHN B. BARTHOLOMEW, a citizen of the United States, residing at Peoria, in the county of Peoria and State of Illinois, have invented certain new and useful Improvements in Clutch Mechanisms for Planters, of which the following is a specification, reference being had therein to the accompanying drawing.

This invention relates to planters of the type especially adapted for planting corn; and has particularly to do with the clutch mechanism for connecting the seeder shaft intermittently with the driving shaft.

The invention has as its object the provision of a clutch which is simple in construction and at the same time strong and reliable.

In the accompanying drawings I have shown that embodiment of my invention which I now deem preferable.

Of the drawings—Figure 1 is a plan view of a planter having a clutch embodying my invention. Figs. 2, 3 and 4 are fragmentary cross-sectional views taken along the line X—X of Fig. 1, and showing the clutch and adjacent parts in different positions. Fig. 5 is a fragmentary elevation of the clutch and adjacent parts. Fig. 6 is a cross-sectional view through the clutch and adjacent parts.

Referring to the drawings, 1 represents as a whole a planter frame mounted upon the rotatable axle 2, which is supported and driven by the wheels 3, 3.

4, 4 represent seed separating mechanisms mounted upon the frame 1. These mechanisms are operatively connected with the transverse seeder shaft 5.

6 is a rock shaft extending parallelly with the seeder shaft. This rock shaft is provided at its ends with forks 7, 7, each of which is adapted to be engaged by the tappets on a check wire to cause the shaft to be rocked.

8 is a disk rotatably mounted upon the axle 5. The disk 8 is provided with a hub 9 upon which are formed sprocket teeth 10. A sprocket chain 11 engages with the teeth 10 and passes over a sprocket wheel 12 on the main axle 2. Suitable guide devices 13 for the chain are provided between the sprockets 10 and 12. By this means the disk 8 is continuously rotated at a speed proportionate to that of the driving wheels. Adjacent this disk 8 is a second disk 14, which is rigidly secured to the shaft 5 for rotation therewith.

15 is a lever pivotally mounted intermediate its ends at 15$^a$ on the disk 14. This lever carries at its forward end a pivotally mounted roller 16 which is in the plane of the disk 8. The disk 8 is provided with a circumferential series of arcuate notches 17 each adapted to receive the roller 16. A spring 18 on the disk 14 tends to hold the lever 15 in position with the roller 16 engaged with one of the notches 17.

Upon the rock shaft 6 at a point adjacent the disk 14 there is clamped or otherwise secured an arm 19 upon which there is pivotally mounted a lever 20. A stop 21 is formed on the lever for engagement with the arm 19 and a coil spring 22 serves to hold the lever in position with the stop 21 engaged with the arm, as shown in Figs. 2 and 3. At the outer end of the lever 20 is a lug 23 adapted to enter a notch 24 in the periphery of the disk 14. The end of the lever 15 which is opposite the roller 16 is normally held by the spring 18 in transverse alinement with the notch 24. A supplemental lug 23$^a$ projects transversely from the end of the lever 20 into the plane of the lever 15. When the parts are in the position shown in Fig. 2, with the lug 23 engaged with the notch 24, the lug 23$^a$ serves to hold the lever 15 with the roller 16 in the position shown out of engagement with the notches 17 of the disk 8.

In operation, when the planter is moving across a field with a check wire arranged to periodically actuate the rock shaft 6 by means of one of the forks 7, the clutch parts are positioned between actuations, as shown in Fig. 2. When a tappet of the check wire is engaged the rock shaft is moved to the position shown in Fig. 3 and with it is carried the lever 20. On account of the movement of the lever 20 away from the disks, the disk 14 is released and simultaneously the lever 15 is released and left free to move under the action of the spring 18 to throw the roller 16 into engagement with a notch 17. As soon as the roller 16 is engaged with a notch motion will be at once transmitted from the continuously rotating disk 8 through the roller and lever 15 to the disk 14, and thence through the shaft 5 to the seed separating mechanisms 4, 4.

The rock shaft and associated parts, after being moved to the position indicated in Fig. 3, are promptly returned to the position shown in Fig. 4. It will be observed that the lever 20 has been moved in relation to the arm 19 against the influence of the spring 22 because of the engagement of the lug 23 with the periphery of the disk 14. This position of the lever 20 is maintained until the disks have completed a revolution. As the disks and connected parts approach the position shown in Fig. 2 the end of the lever 15 is first engaged by the lug 23ª and is moved with respect to the disk 14 to force the roller 16 out of its notch 17. When the disk 14 is rotated sufficiently to bring the lug 23 into alinement with the notch 24, the lug snaps into place under the influence of the spring 22 and the disk 14 is locked against further rotation. The movement of the lever 20, as the lug goes into the notch, causes additional movement of the lever 15 to throw the roller 16 far enough out so that there is no possibility of its engaging the teeth between the notches 17 as the rotation of the disk 8 continues. This cycle of operations takes place at each movement of the rock shaft 6, a hill being planted at each actuation of the seeder shaft.

This application constitutes a division of my co-pending application for corn planters, filed March 6, 1908, Serial No. 419,434.

I claim—

1. In a clutch for a planter or other mechanism, the combination of a rotatable disk-like driver provided with a series of notches in its outer periphery, a power transmitting disk mounted adjacent the driver for rotation about an axis coincident with the axis thereof, a lever pivoted between its ends to the disk for movement about an axis parallel to the axis of rotation and provided at one end with means for engaging one of the notches of the driver, the location of the said pivotal axis being such that the said engaging means when engaged with a notch in the rotating driver is drawn into the notch by the tension in the lever, a spring between the lever and the disk for moving the lever into engagement with the driver, a lug for engagement with the free end of the lever to normally maintain the means at the other end out of engagement with the driver, means for moving the lug out of operative position to permit the lever to engage the driver under the action of the spring, and means for returning the lug to operative position to cause the lever to be disengaged from the driver as the disk is rotated.

2. In a clutch for a planter or other mechanism, the combination of a rotatable disk-like driver provided with a series of notches in its outer periphery, a power transmitting disk mounted adjacent the driver for rotation about an axis coincident with the axis thereof, the disk having a notch in its periphery, a lever pivoted between its ends to the disk for movement about an axis parallel to the axis of rotation and provided at one end with means for engaging one of the notches of the driver, the location of the said pivotal axis being such that the said engaging means when engaged with a notch in the rotating driver is drawn into the notch by the tension in the lever, a spring between the lever and the disk for moving the lever into engagement with the driver, a lug for engagement with the free end of the lever to normally maintain the means at the other end out of engagement with the driver and for engagement with the notch in the disk to lock the said disk against rotation, means for moving the lug out of operative position to release the disk and to permit the lever to engage the driver under the action of the spring, and means for returning the lug to operative position to cause the lever to be disengaged from the driver as the disk is rotated and to cause the disk to be locked against rotation.

3. In a clutch for a planter or other mechanism, the combination of a rotatable disk-like driver provided with a series of notches in its outer periphery, a power transmitting disk mounted adjacent the driver for rotation about an axis coincident with the axis thereof, the disk having a notch in its periphery, a lever pivoted between its ends to the disk for movement about an axis parallel to the axis of rotation and provided at one end with means for engaging one of the notches of the driver, the location of the said pivotal axis being such that the said engaging means when engaged with a notch in the rotating driver is drawn into the notch by the tension in the lever, a spring between the lever and the disk for moving the lever into engagement with the driver, a lug for engagement with the free end of the lever to normally maintain the means at the other end out of engagement with the driver and for engagement with the notch in the disk to lock the said disk against rotation, means for moving the lug out of operative position to release the disk and to permit the lever to engage the driver under the action of the spring, and means for returning the lug first into engagement with the periphery of the disk in position to engage the lever to cause it to be disengaged from the driver as the disk is rotated and for subsequently moving the lug into the notch of the disk, thereby locking the disk against rotation and moving the lever farther out of engagement with the driver.

In testimony whereof I affix my signature, in presence of two witnesses.

JOHN B. BARTHOLOMEW.

Witnesses:
J. M. CALDWELL,
L. M. STACY.

Copies of this patent may be obtained for five cents each, by addressing the "Commissioner of Patents, Washington, D. C."